United States Patent [19]

Grinwald

[11] 4,418,852
[45] Dec. 6, 1983

[54] SPARE WHEEL-TIRE CARRIER

[75] Inventor: Israel M. Grinwald, Southfield, Mich.

[73] Assignee: The United States of America as represented by the Secretary of the Army, Washington, D.C.

[21] Appl. No.: 389,198

[22] Filed: Jun. 17, 1982

[51] Int. Cl.³ ............................................. B62D 43/04
[52] U.S. Cl. ............................ 224/42.23; 224/42.12; 224/310; 296/37.2; 414/466
[58] Field of Search .............. 224/42.23, 42.21, 42.26, 224/42.3, 42.29, 42.12, 42.03, 310, 42.18; 414/463, 466; 296/37.2

[56] References Cited

U.S. PATENT DOCUMENTS

| 1,292,687 | 1/1919 | Biggs | 224/42.18 |
|---|---|---|---|
| 1,761,968 | 6/1930 | Bock | 224/42.23 |
| 2,091,071 | 8/1937 | Girl | 224/42.21 X |
| 2,603,527 | 7/1952 | Perkins | 296/37.2 |
| 2,661,131 | 12/1953 | Roy | 224/42.26 |
| 2,859,887 | 11/1958 | Haight | 224/310 X |
| 2,936,918 | 5/1960 | Vais | 224/42.23 X |
| 3,731,860 | 5/1973 | Davis | 224/42.06 |
| 3,869,075 | 3/1975 | Kissner | 224/42.06 |
| 3,912,099 | 10/1975 | Liebermann | 296/37.2 X |
| 4,072,258 | 2/1978 | Cruson | 224/42.23 X |
| 4,221,312 | 9/1980 | Wertjes | 224/42.23 X |
| 4,230,246 | 10/1980 | Wilson | 224/42.21 |
| 4,312,620 | 1/1982 | Muschalek, Jr. | 224/42.23 X |
| 4,350,471 | 9/1982 | Lehmann | 224/42.21 X |

FOREIGN PATENT DOCUMENTS 1576808 10/1980 United Kingdom .............. 224/42.12

Primary Examiner—Allen N. Shoap
Assistant Examiner—Robert Petrik
Attorney, Agent, or Firm—Robert P. Gibson; Peter A. Taucher; John E. McRae

[57] ABSTRACT

A spare tire carrier attachable to the underside of a trailer or other vehicle not equipped with an interior spare tire storage space. The carrier includes three or more transversely extending roller support units located to underlie a surface of the tire when it is in its stored position. During manual movement of the spare tire to or from its stored position the rollers turn on their rotational axes to facilitate tire motion. The carrier can be constructed in different sizes for use with different vehicles and spare tire sizes. The carrier is preferably formed from standard commercially-available structural components, such as rods, bars and tubes, thereby facilitating use on military vehicles where the low volume usage does not warrant an expensive tooling investment.

1 Claim, 6 Drawing Figures

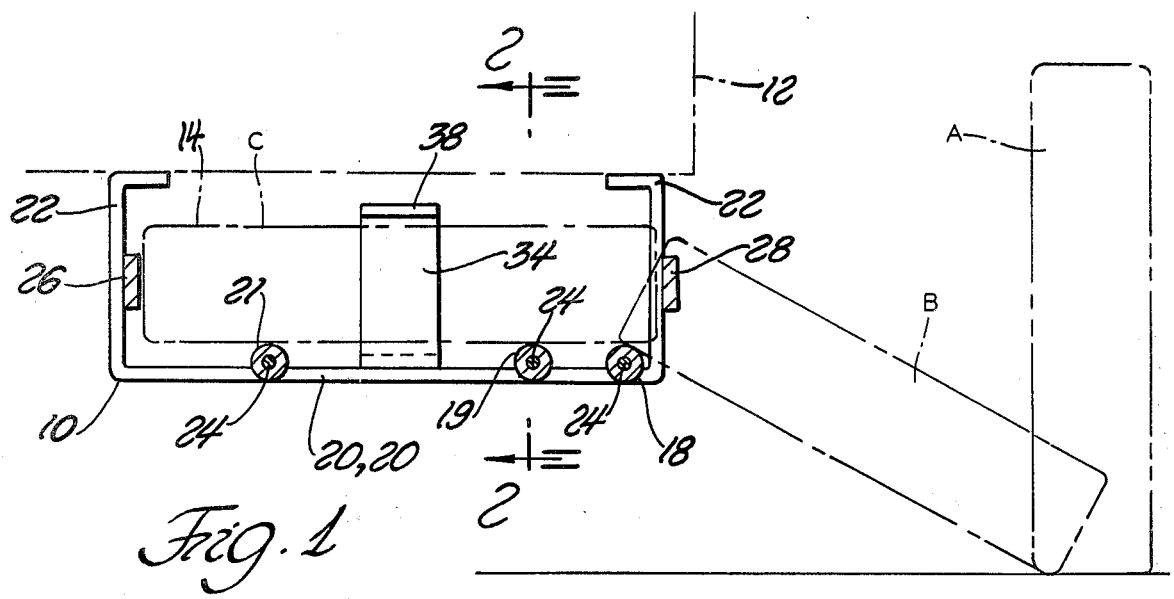
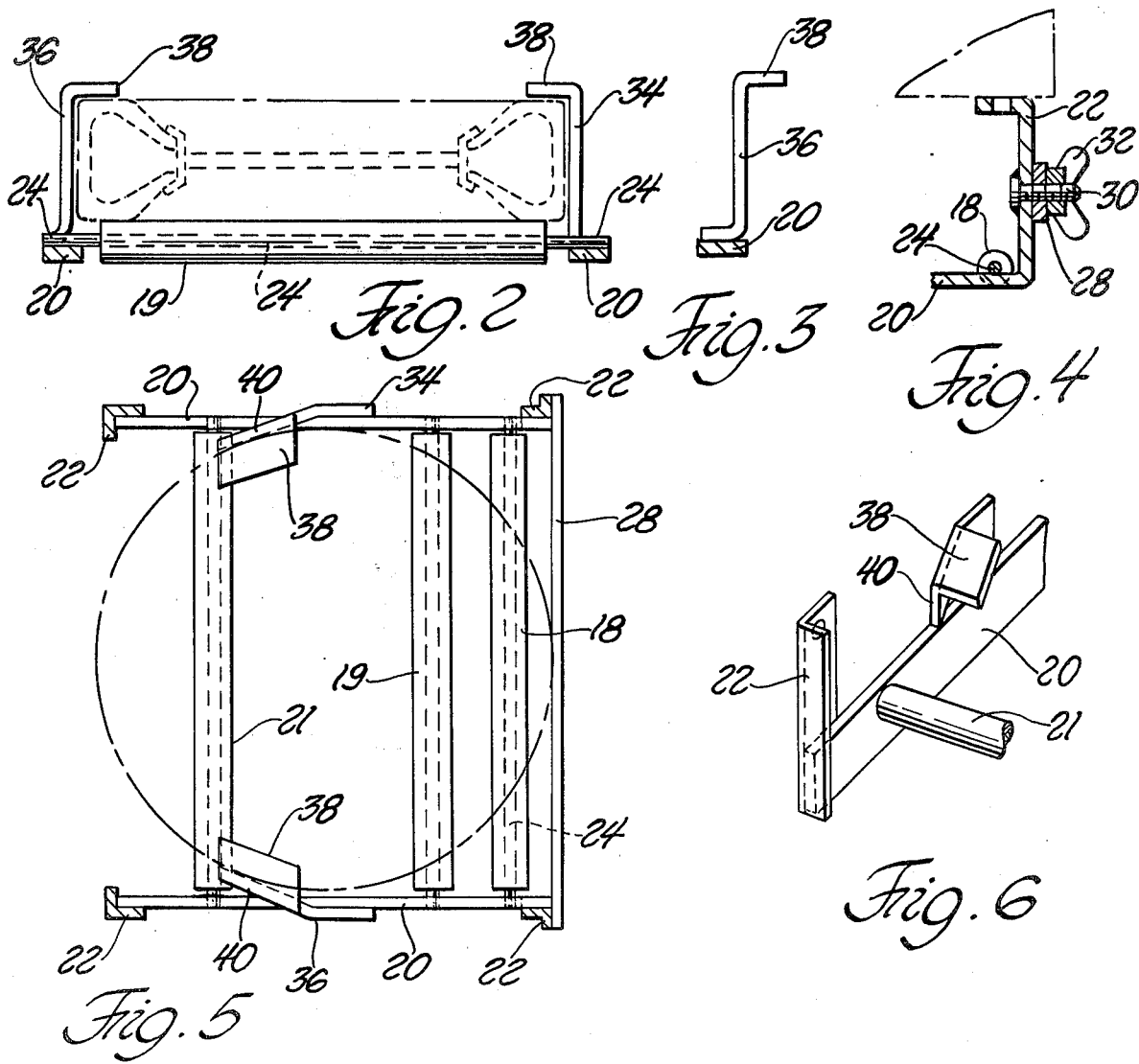

SPARE WHEEL-TIRE CARRIER

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a carrier attachable to the underside of a vehicle to support a spare wheel-tire assembly when the vehicle is in motion. The carrier may be utilized on or under different types of vehicles, such as trucks, Army jeeps, large multi-wheeled trailers or vans, or smaller trailers of the two or four wheel type. The carrier has functional similarities to the spare tire carriers shown in U.S. Pat. No. 3,369,683 to Richards, U.S. Pat. No. 3,435,971 to Powell, U.S. Pat. No. 4,221,312 to Wertjes, and U.S. Pat. No. 4,312,620 to Muschalek.

The carrier of my invention is particularly designed as a low cost rugged structure occupying minimum space under a trailer or other vehicle. A special effort has been made to use standard commercially available bars, rods and tubes, thereby enabling the carrier to be formed at relatively low cost in the small quantities commonly utilized by the military. The carrier is especially intended for rough usage on military vehicles adapted to travel over off-road terrain.

THE DRAWINGS

FIG. 1 is a sectional view through one embodiment of the invention, taken on its longitudinal centerline.

FIG. 2 is a transverse sectional view on line 2—2 in FIG. 1.

FIGS. 3 and 4 are fragmentary sectional views taken through the FIG. 1 embodiment.

FIG. 5 is a top plan view taken through a second embodiment of the invention.

FIG. 6 is a perspective view of a structural detail used in the FIG. 5 embodiment.

Referring in greater detail to FIGS. 1 through 4, there is shown a carrier 10 attachable to the undersurface of a conventional vehicle 12 to support a wheel-tire assembly 14 while the vehicle is in motion. The vehicle can be a truck, trailer, camper, wheeled personnel carrier or other vehicle lacking interior storage space for the spare tire. Vehicles of particular interest are military vehicles, especially trailers. The carrier can be positioned near the rear end of the vehicle or amidships off center from the vehicle longitudinal centerline. The carrier is required to be located in an unobstructed space where it can be accessible for removing a sound tire and inserting a deflated blown-out tire in its place.

As best seen in FIG. 1, the wheel-tire assembly 14 can be installed in the carrier by positioning it in an upright attitude A away from the vehicle, then tipping the tire-wheel assembly onto a roller 18 in the carrier to the inclined position B, and then sliding the assembly into the carrier to retained position C. The reverse procedure is used to remove the tire from the carrier.

The carrier comprises two similar parallel horizontal bars or straps 20, 20 having upstanding suspension arms 22, 22 at their opposite ends for attachment to the undersurface of the vehicle. Three circular cross-sectioned rods 24 extend transversely between bars 20 at horizontally spaced points therealong; welded connections are used to rigidly secure rods 24 to bars 20, to thus form a rigid frame structure having substantial resistance to twist or bending forces. Prior to final welding operations on rods 24 an elongated sleeve 18, 19 or 21 is trained over each rod 24 to form a roller; each roller sleeve is freely rotatable on the associated rod 24.

The outermost roller 18 is located in close proximity to the assocated suspension arms 22 at the outer end of the frame structure, whereby a wheel-tire assembly can be located in position B resting partly on the roller and partly on the ground. The wheel-tire assembly can be lifted from position B into a horizontal attitude and then pushed rightwardly into the carrier frame; horizontal manual motion of a heavy wheel-tire assembly is greatly eased by the presence of rollers 18, 19 and 21. Relatively slight manual effort is required to achieve rotation of the roller sleeves and advancement of the wheel-tire assembly, even when the assembly is relatively heavy, e.g., in excess of seventy-five pounds.

When the assembly reaches retained position C it engages a horizontal crosspiece 26 extending between the two suspension arms 22 at the inner end of the carrier. Thereafter a second crosspiece 28 is attached to the other suspension arms 22 at the outer end of the carrier. As best shown in FIG. 4, crosspiece 28 may be removably attached to each suspension arm 22 by means by means of a bolt or stud 30 projecting from arm 22 and a wing nut 32 threaded thereon. Crosspieces 26 and 28 cooperatively prevent longitudinal shifting of the wheel-tire assembly in the carrier.

Lateral shifting of the wheel-tire assembly is prevented by two upstanding bars 34 and 36 affixed to bars 20 at points midway between the two crosspieces 26 and 28. Each bar 34 or 36 may have an inturned flange 38 at its upper end adapted to closely overlie the tire when the wheel-tire assembly is pushed to its retained position C. Bars 34 and 36 cooperatively prevent lateral motion of the tire and/or vertical bumping up and down relative to rollers 19 and 21. Rollers 19 and 21 are preferably equidistant from flanges 38 whereby the weight of the retained wheel-tire assembly is borne substantially equally by the two rollers. Flanges 38 overlie the tire along a transverse centerline through the wheel, whereby the wheel is effectively captured and precluded from vibrating or bumping around to create wear or noise.

As best seen in FIG. 2, each roller sleeve is slightly shorter than the available space between the parallel bars 20. Should the wheel-tire assembly be slightly off center when it is initially deposited in position B it will be displaced laterally while it is being positioned toward its retained position C. The circular peripheral edge of the tire will contact the edge of one of the suspension arms 22 at the outer end of the carrier; the roller sleeve will slide axially along the associated rod 24 to center the wheel-tire assembly relative to the upstanding bars 34 and 36.

The carrier may be formed from different types of standard bars, rods and tubes. FIGS. 5 and 6 show a form of the invention in which the horizontal bars or stringers 20, 20 are arranged with their major cross sectional dimensions oriented vertically rather than horizontally as in the FIG. 1 embodiment. In the FIG. 5 embodiment the suspension arms 22 are formed by means of vertical angle irons welded to bars 20. The construction of the carrier is determined partly by the nature of the vehicle and the space available for attaching the carrier to the vehicle undersurface.

The FIG. 5 embodiment includes two upstanding bars 34 and 36 having inturned flanges 38 at their upper ends. The bars include inwardly bent sections 40 which act as tire retention devices, thus avoiding the need for crosspiece 26 that is used in the FIG. 1 embodiment. In other respects the FIG. 5 embodiment is generally similar to the FIG. 1 construction.

I wish it to be understood that I do not desire to be limited to the exact details of construction shown and described for obvious modifications will occur to a person skilled in the art.

I claim:

1. A carrier for wheel-mounted tires that attaches to the undersurface of a vehicle comprising;

a frame structure that includes two horizontal bars parallel to each other, said bars being widely spaced apart by a distance approximately the same as the diameter of the tire to be supported, an upstanding suspension arm at each end of each bar, means at the upper end of each suspension arm for affixing the carrier to the vehicle; the suspension arms being rigidly affixed to the horizontal bars and to the vehicle so that the defined frame structure is immovable relative to the vehicle;

first, second and third circular rods extending transversely between the horizontal bars, each rod having its ends rigidly to the associated horizontal bars such that the rods act as structural reinforcements for the frame structure;

first, second and third roller sleeves freely rotatable encircling respective ones of the rods, the roller sleeves being slightly shorter than the space between the parallel bars, whereby each roller sleeve can slide a limited distance along its rod parallel to the rod axis to accommodate slight off-center positions of a tire; the first roller sleeve being located in close proximity to one set of suspension arms at the outermost ends of the horizontal bars, whereby a mounted tire can be positioned in an inclined attitude resting partly on the ground and partly on the first roller sleeve, after which the mounted tire can be lifted to a horizontal attitude and then moved over the three roller sleeves to a retained position within the space circumscribed by the upstanding suspension arms, said three roller sleeves providing the entire support for a mounted tire inserted into the space above the roller sleeves;

the second and third roller sleeves being spaced equal distances from an imaginary transverse line through the geommetrical center of the mounted tire when it is supported on the roller sleeves, said second and third roller sleeves being widely spaced from the center of gravity of the supported tire;

two upstanding bars carried by respective ones of the aforementioned horizontal bars, said upstanding bars being located on the aforementioned transverse line through the geommetric center of the mounted tire, the upstanding bars being spaced apart a distance slightly greater than the diameter of the tire in its retained position, whereby lateral motion of the tire is prevented; each upstanding bar having an inturned flange at its upper end to closely overlie the tire whereby vertical jarring forces associated with a moving vehicle are prevented from disturbing the tire position.

* * * * *